(12) United States Patent
Huang

(10) Patent No.: US 11,729,760 B2
(45) Date of Patent: Aug. 15, 2023

(54) PHYSICAL DOWNLINK SHARED CHANNEL RECEIVING AND TIME DOMAIN RESOURCE INDICATING METHOD, DEVICE, STORAGE MEDIUM, BASE STATION, AND TERMINAL

(71) Applicant: Beijing Spreadtrum Hi-Tech Communications Technology Co., Ltd., Beijing (CN)

(72) Inventor: Su Huang, Beijing (CN)

(73) Assignee: Beijing Spreadtrum Hi-Tech Communications Technology Co., Ltd., Beijing (CN)

( * ) Notice: Subject to any disclaimer, the term of this patent is extended or adjusted under 35 U.S.C. 154(b) by 0 days.

(21) Appl. No.: 16/321,408

(22) PCT Filed: Jan. 22, 2019

(86) PCT No.: PCT/CN2019/072668
§ 371 (c)(1),
(2) Date: Jan. 28, 2019

(87) PCT Pub. No.: WO2019/184565
PCT Pub. Date: Oct. 3, 2019

(65) Prior Publication Data
US 2021/0337563 A1    Oct. 28, 2021

(30) Foreign Application Priority Data
Mar. 29, 2018    (CN) .......................... 201810272049.0

(51) Int. Cl.
*H04W 72/1263*    (2023.01)
*H04W 72/0446*    (2023.01)
(Continued)

(52) U.S. Cl.
CPC .... *H04W 72/1263* (2013.01); *H04W 72/0446* (2013.01); *H04W 72/23* (2023.01); *H04W 72/30* (2023.01)

(58) Field of Classification Search
CPC .......... H04W 72/1263; H04W 72/042; H04W 72/005; H04W 72/0446
See application file for complete search history.

(56) References Cited

U.S. PATENT DOCUMENTS 10,425,264 B2 *  9/2019  Ko ...................... H04L 27/2662
10,609,713 B2 *  3/2020  Lin ........................ H04W 48/16
(Continued)

FOREIGN PATENT DOCUMENTS

CN    103733560 A    4/2014
CN    106992847 A    7/2017
(Continued)

OTHER PUBLICATIONS

The State Intellectual Property Office of the People's Republic of China, First Office Action for Chinese Patent Application No. 201810272049A.
(Continued)

*Primary Examiner* — Nishant Divecha
(74) *Attorney, Agent, or Firm* — Womble Bond Dickinson (US) LLP

(57) ABSTRACT

Disclosed in some examples are a method for physical downlink shared channel receiving and a method for indicating its time domain resource, and a device, a storage medium, a base station, and a terminal thereof. The method for indicating the time domain resource for the physical downlink shared channel includes: determining a starting symbol position of the time domain resource for transmitting the physical downlink shared channel based on a symbol position for a front loaded demodulation reference signal;
(Continued)

- S101 Determining a starting symbol position of the time domain resource for transmitting the physical downlink shared channel based on a symbol position for a front loaded demodulation reference signal

- S102 Determining a row index in a preset time domain table at least based on the starting symbol position

- S103 Carrying the row index in a downlink control information and transmitting the downlink control information to a user equipment determining a row index in a preset time domain table at least based on the starting symbol position; and carrying the row index in a downlink control information, and transmitting the downlink control information to a user equipment. The technical solution of the present disclosure can achieve the flexibility in PDSCH schedule.

12 Claims, 3 Drawing Sheets

(51) Int. Cl.
*H04W 72/23* (2023.01)
*H04W 72/30* (2023.01)

(56) References Cited

U.S. PATENT DOCUMENTS

| | | | | |
|---|---|---|---|---|
| 10,863,537 | B2* | 12/2020 | Liou | H04W 72/1289 |
| 11,012,209 | B2* | 5/2021 | Choi | H04W 72/04 |
| 11,012,974 | B2* | 5/2021 | Murray | H04W 52/0229 |
| 11,025,456 | B2* | 6/2021 | Chatterjee | H04W 80/02 |
| 11,259,237 | B2* | 2/2022 | John Wilson | H04W 76/11 |
| 2017/0230956 | A1 | 8/2017 | Kim et al. | |

FOREIGN PATENT DOCUMENTS

| | | |
|---|---|---|
| CN | 107005386 A | 8/2017 |
| CN | 107210794 A | 9/2017 |
| CN | 108886451 A | 11/2018 |
| WO | 2017176433 A1 | 10/2017 |
| WO | 2018004180 A1 | 1/2018 |

OTHER PUBLICATIONS

3GPP TSG RAN WG1, "Corrections on CA operation," Meeting #92, Agenda Item 7.1.3.4.2, Feb. 26-Mar. 2, 2018, Athens, Greece.

3GPP TSG RAN WG1, "Discussion on remaining issues for time domain resource allocation," Meeting AH 1801. Agenda Item 7.3.3.1, Jan. 22-26, 2018, Vancouver, Canada.

3GPP TSG RAN WG1, "Draft time domain resource allocation proposal," Meeting #92, Agenda Item 7.1.3.3.1, Feb. 26-Mar. 2, 2018, Athens, Greece.

International Search Report dated Apr. 22, 2019 for International Patent Application No. PCT/CN2019/072668.

* cited by examiner

PHYSICAL DOWNLINK SHARED CHANNEL RECEIVING AND TIME DOMAIN RESOURCE INDICATING METHOD, DEVICE, STORAGE MEDIUM, BASE STATION, AND TERMINAL

This application is a U.S. national stage application of the PCT International Application No. PCT/CN2019/072668 filed on Jan. 22, 2019, which claims the benefit of foreign priority of Chinese patent application No. 201810272049.0 filed on Mar. 29, 2018, the contents all of which are incorporated herein by reference.

TECHNICAL FIELD

The present disclosure relates to the field of communication technology, and in particular, to a method for physical downlink shared channel receiving, method for indicating its time domain resource, and a device, a storage medium, a base station, and a terminal thereof.

BACKGROUND

In the frame structure of the new radio (NR) system in the $3^{rd}$ Generation Partnership Project (3GPP), in a radio frame with a length in time domain of 10 ms, each radio frame includes 10 subframes of the same size with a length of 1 ms. Each subframe includes a plurality of slots. Each slot consists of a certain number of symbols, which is determined by the type of a cyclic prefix (CP).

In the prior art, the format of downlink control information (DCI) for scheduling the physical downlink shared channel (PDSCH) in the NR system includes Format 1_0 and Format 1_1. The above-mentioned DCI format includes a time domain resource assignment for notifying the user equipment (UE) the location of the used PDSCH time domain resource. The DCI may indicate a row index directed to the UE time domain specific table to provide orthogonal frequency division multiplexing (OFDM) symbols for PDSCH transmission, including an OFDM starting symbol, an assigned OFDM symbol length, a slot offset for PDSCH transmission, and a PDSCH mapping type, i.e. Type A or Type B. The UE time domain specific table used by DCI Format 1-1 can be configured by high layer signaling.

However, none of the UE time domain specific tables used by DCI Format 1-0 is configurable, making the scheduled resources available for the PDSCH limited.

SUMMARY

The present disclosure aims to solve the technical problem on how to achieve the flexibility in the PDSCH schedule.

In order to solve the above technical problem, embodiments of the present disclosure provide a method for indicating a time domain resource for a physical downlink shared channel, comprising: determining a starting symbol position of the time domain resource for transmitting the physical downlink shared channel based on a symbol position for a front loaded demodulation reference signal; determining a row index in a preset time domain table at least based on the starting symbol position; and carrying the row index in a downlink control information and transmitting the downlink control information to a user equipment.

In a possible embodiment, in the preset time domain table, the row index indicates a plurality of different starting positions and corresponding symbol lengths. The plurality of different starting positions correspond to a plurality of configurable symbol positions for the front loaded demodulation reference signal.

In a possible embodiment, the user equipment detects the downlink control information outside a set of control resources of physical broadcast channel configurations.

In a possible embodiment, the user equipment detects the downlink control information within a set of control resources. The set of control resources are time-division multiplexed with transmission resources for the physical downlink shared channel.

In a possible embodiment, the starting symbol position indicated by the row index is 8, and the symbol length occupied by the time domain resources is 4.

In a possible embodiment, the symbol position for the front loaded demodulation reference signal is mapped based on physical broadcast channel configurations.

In a possible embodiment, the starting symbol position indicated by the row index is 8, 9, or 10, and the symbol length occupied by the time domain resource is 4; or the starting symbol position indicated by the row index is 7, and the symbol length occupied by the time domain resource is 7.

In a possible embodiment, determining the row index in the preset time domain table at least based on the starting symbol position comprises: determining the row index based on the starting symbol position and the symbol length required for the time domain resource.

To solve the above-mentioned technical problem, embodiments of the present disclosure further disclose a method for physical downlink shared channel receiving, comprising: acquiring a front loaded demodulation reference signal and a row index carried in downlink control information; determining, based on the row index and a symbol position for the front loaded demodulation reference signal, a starting symbol position and a symbol length of a time domain resource for transmitting a physical downlink shared channel in a preset time domain table; and demodulating the physical downlink shared channel based on the starting symbol position and the symbol length of the time domain resource.

In a possible embodiment, in the preset time domain table, the row index indicates a plurality of different starting positions and corresponding symbol lengths. The plurality of different starting positions correspond to a plurality of configurable symbol positions for the front loaded demodulation reference signal.

In a possible embodiment, acquiring the row index carried in the downlink control information comprises: detecting and receiving the downlink control information outside a set of control resources of physical broadcast channel configurations.

In a possible embodiment, acquiring the row index carried in the downlink control information comprises: detecting the downlink control information within a set of control resources. The set of control resources are time-division multiplexed with transmission resources for the physical downlink shared channel.

In a possible embodiment, the starting symbol position indicated by the row index is 8, and the symbol length occupied by the time domain resources is 4.

In a possible embodiment, the symbol position for the front loaded demodulation reference signal is mapped based on physical broadcast channel configurations.

In a possible embodiment, acquiring the row index carried in the downlink control information comprises: the starting symbol position indicated by the row index is 8, 9, or 10, and the symbol length occupied by the time domain resource is 4; or the starting symbol position indicated by the row index is 7, and the symbol length occupied by the time domain resource is 7.

Embodiments of the present disclosure further provide a device for indicating a time domain resource for a physical downlink shared channel, comprising: a starting symbol position determining module, adapted to determine a starting symbol position of the time domain resource for transmitting the physical downlink shared channel based on a symbol position for a front loaded demodulation reference signal; a row index determining module, adapted to determine a row index in a preset time domain table at least based on the starting symbol position; and a row index transmitting module, adapted to carry the row index in the downlink control information and transmit the downlink control information to a user equipment.

In a possible embodiment, the row index in the preset time domain table indicates a plurality of different starting positions and corresponding symbol lengths. The plurality of different starting positions correspond to a plurality of configurable symbol positions for the front loaded demodulation reference signal.

In a possible embodiment, the user equipment detects the downlink control information outside a set of control resources of physical broadcast channel configurations.

In a possible embodiment, the user equipment detects the downlink control information within a set of control resources. The set of control resources are time-division multiplexed with transmission resources for the physical downlink shared channel.

In a possible embodiment, the starting symbol position indicated by the row index is 8, and the symbol length occupied by the time domain resources is 4.

In a possible embodiment, the symbol position for the front loaded demodulation reference signal is mapped based on physical broadcast channel configurations.

In a possible embodiment, the starting symbol position indicated by the row index is 8, 9, or 10, and the symbol length occupied by the time domain resource is 4; or the starting symbol position indicated by the row index is 7, and the symbol length occupied by the time domain resource is 7.

In a possible embodiment, determining the row index in the preset time domain table at least based on the starting symbol position comprises: determining the row index based on the starting symbol position and the symbol length required for the time domain resource.

Embodiments of the present disclosure further provide a device for physical downlink shared channel receiving, comprising: a row index receiving module, adapted to acquire a front loaded demodulation reference signal and a row index carried in downlink control information; a time domain resource determining module, adapted to determine, based on the row index and a symbol position for the front loaded demodulation reference signal, a starting symbol position and a symbol length for a time domain resource for transmitting a physical downlink shared channel in a preset time domain table; and a physical downlink shared channel demodulating module, adapted to demodulate the physical downlink shared channel based on the starting symbol position and the symbol length for the time domain resource.

In a possible embodiment, in the preset time domain table, the row index indicates a plurality of different starting positions and corresponding symbol lengths. The plurality of different starting positions correspond to a plurality of configurable symbol positions for the front loaded demodulation reference signal.

In a possible embodiment, the row index receiving module detects and receives the downlink control information outside a set of control resources of physical broadcast channel configurations.

In a possible embodiment, the row index receiving module detects the downlink control information within a set of control resources. The set of control resources are time-division multiplexed with transmission resources for the physical downlink shared channel.

In a possible embodiment, the starting symbol position indicated by the row index is 8, and the symbol length occupied by the time domain resources is 4.

In a possible embodiment, the symbol position for the front loaded demodulation reference signal is mapped based on physical broadcast channel configurations.

In a possible embodiment, the starting symbol position indicated by the row index is 8, 9, or 10, and the symbol length occupied by the time domain resource is 4; or the starting symbol position indicated by the row index is 7, and the symbol length occupied by the time domain resource is 7.

Embodiments of the present disclosure further provide a storage medium having computer instructions stored thereon, wherein when operated by a machine the computer instructions can cause the machine to execute the steps of the method for indicating a time domain resource for a physical downlink shared channel, or the steps of the method for physical downlink shared channel receiving.

Embodiments of the present disclosure further provide a base station, comprising: a memory storing computer instructions executable on a processor, and the processor, wherein when operated by the processor the computer instructions can cause the processor to execute the steps of the method for indicating a time domain resource for a physical downlink shared channel.

Embodiments of the present disclosure further provide a terminal, comprising: a memory storing computer instructions executable on a processor, and the processor, wherein when operated by the processor the computer instructions can cause the processor to execute the steps of the method for physical downlink shared channel receiving.

Compared with the prior art, the technical solutions in the embodiments of the present disclosure achieve the following advantageous effects:

The technical solutions of the present disclosure determine a starting symbol position of the time domain resource for transmitting the physical downlink shared channel based on a symbol position for a front loaded demodulation reference signal; determine a row index in a preset time domain table at least based on the starting symbol position; and transmitting the row index carried in a downlink control information to a user equipment. In the technical solutions of the present disclosure, the row index in the preset time domain table indicates a plurality of different starting symbol positions, and the plurality of different starting symbol positions correspond to a plurality of configurable symbol positions for the front loaded demodulation reference signal, thereby fewer row indexes can be used to indicate more starting symbol positions; furthermore, in the case that the total amount of row indexes in the preset table is limited, the row indexes can be saved for configurations of other more mapping types, achieving the flexibility in PDSCH schedule.

Furthermore, the user equipment detects the downlink control information within a set of control resources, and the set of control resources are time-division multiplexed with transmission resources for the physical downlink shared channel. The starting symbol position indicated by the row index is 8, and the symbol length occupied by the time domain resources is 4. In the technical solutions of the present disclosure, the mapping type of PDSCH is Type B, i.e., the symbol position for the front loaded demodulation reference signal is at the first symbol position of the time domain resource. When the time-domain relationship between the set of control resources and the PDSCH is time-division multiplexing and the set of control resources is at a high frequency, it is possible to support a configuration that the starting symbol position of the time domain resource is 8, and the occupied symbol length is 4, so as to finish the resource schedule for the PDSCH within the same slot when the starting symbol position for the set of control resources is 7 and the length thereof is 1, meeting the user's demands.

Furthermore, the starting symbol position indicated by the row index is 8, 9, or 10, and the symbol length occupied by the time domain resource is 4; or the starting symbol position indicated by the row index is 7, and the symbol length occupied by the time domain resource is 7. In the technical solutions of the present disclosure, when the mapping type of PDSCH is Type B, and the user equipment detects the downlink control information outside a set of control resources of physical broadcast channel configurations, it is possible to support a configuration that the starting symbol position of the time domain resource is 8, 9, or 10, and the occupied symbol length is 4, and that the starting symbol position of the time domain resource is 7, the occupied symbol length is 7, so as to realize more configurations of the resource schedule for PDSCH under the mapping Type B, and further improve the flexibility in PDSCH schedule.

DETAILED DESCRIPTION

Figure 1:
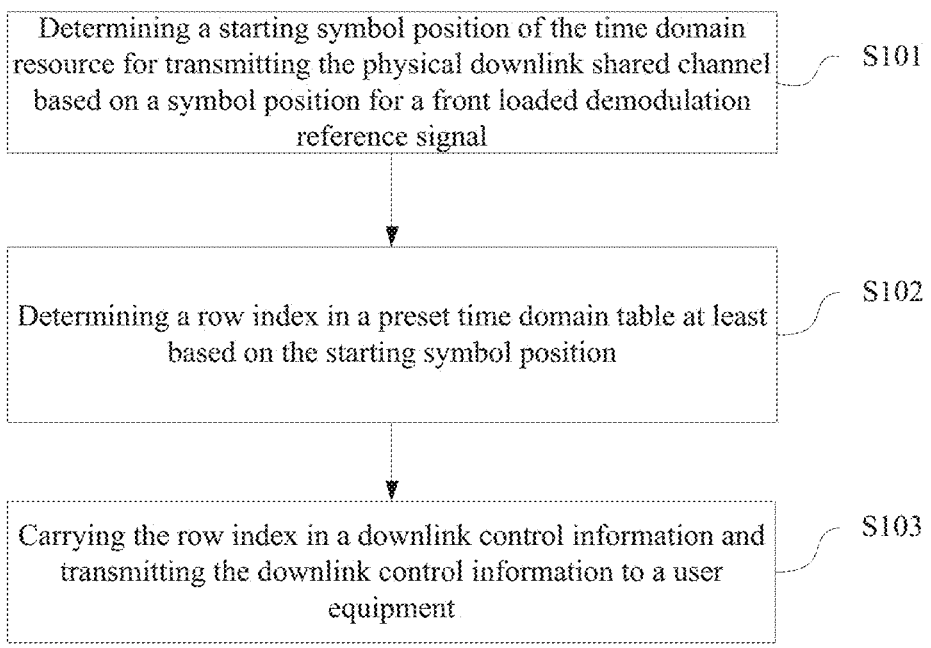
FIG. 1 is a flow chart of a method for indicating a time domain resource for a physical downlink shared channel according to an embodiment of the present disclosure.

As described in the background, none of the UE time domain specific tables used in DCI Format 1-0 is configurable, making schedule resources available to the PDSCH limited. In the RAN1 92 conference for the 3GPP radio access network, as shown in Table 1, there is a proposal R1-1803504 discussing the time domain resources contained in the above table. Table 1 shows the configurations for all the available PDSCH time domain resources in prior schemes, that is, the resource configurations indicated by index 0 to index 15 (including mapping type, slot offset, starting position, and symbol length).

To be specific, in the case where the mapping type is Type A, the front loaded DMRS is mapped according to positions configured in a physical broadcast channel (PBCH), such as symbol 2 and symbol 3. In the case where the mapping type is Type B, the front loaded DMRS is at the first symbol position of the time domain resource for PDSCH.

However, there is a majority of options for resource configuration in the case of mapping Type A, but only a limited number of options for resource configurations are for mapping Type B, which renders the PDSCH scheduling inflexible. Some demands in time domain resources are still not met.

For example, when the PDCCH is within a set of control resources CORESET0 and pattern 1 is used, that is, the CORESET0 is time-division multiplexed with the transmission resources of the PDSCH, an option for time domain resource with PDSCH mapping Type B, the starting symbol being 8 and the length being 4 is not supported; and when the DCI Format 1-0 is detected outside the CORESET0, an option for time domain resource with PDSCH mapping Type B, the starting symbol being 8/9/10 and the length being 4; or an option for time domain resource with PDSCH mapping Type B, the starting symbol being 7 and the length being 7, is not supported.

TABLE 1

| Index | Mapping Type | Slot Offset K0 | Starting position S | Symbol Length L |
|---|---|---|---|---|
| 0 | Type A | 0 | 2 | 12 |
| 1 | Type A | 0 | 2 | 10 |
| 2 | Type A | 0 | 2 | 9 |
| 3 | Type A | 0 | 2 | 8 |
| 4 | Type B | 0 | 4 | 7 |
| 5 | Type B | 0 | 4 | 4 |
| 6 | Type B | 0 | 9 | 4 |
| 7 | Type A | 0 | 3 | 11 |
| 8 | Type A | 0 | 3 | 9 |
| 9 | Type A | 0 | 3 | 8 |
| 10 | Type A | 0 | 3 | 7 |
| 11 | Type B | 0 | 3 | 4 |
| 12 | Type B | 0 | 10 | 4 |
| 13 | Type B | 0 | 5 | 2 |
| 14 | Type B | 0 | 9 | 2 |
| 15 | Type B | 0 | 12 | 2 |

In the technical solution of the present disclosure, each row index in the preset time domain table indicates a plurality of different starting positions, and the plurality of different starting positions correspond to a plurality of configurable symbol positions for the front loaded demodulation reference signal; therefore, fewer row indexes can be used to indicate more starting symbol positions; furthermore, in the case that the total amount of row indexes in the preset table is limited, the row indexes can be saved for configurations of other more mapping types, achieving the flexibility in PDSCH schedule.

Embodiments of the present disclosure will be detailed below in conjunction with the drawings so that the above objective, features and advantages of the present disclosure are more lucid.

FIG. 1 is a flow chart of a method for indicating a time domain resource for a physical downlink shared channel according to an embodiment of the present disclosure.

The method for indicating the time domain resource for the physical downlink shared channel as shown in FIG. 1 can be used on the base station side, e.g., executed by the base station, the method comprising:

step S101: determining a starting symbol position of the time domain resource for transmitting the physical downlink shared channel based on a symbol position for a front loaded demodulation reference signal;

step S102: determining a row index in a preset time domain table at least based on the starting symbol position; and step S103: carrying the row index in a downlink control information, and transmitting the downlink control information to a user equipment.

In this embodiment, the base station can determine a symbol position for the front loaded demodulation reference signal (DMRS). Since the front loaded DMRS is usually at the first symbol position of the time domain resource in the PDSCH, in step S101, the base station can determine the starting symbol position of the time domain resource in the PDSCH based on the symbol position for the front loaded DMRS. In other words, the symbol position for the front loaded DMRS is the starting symbol position of the time domain resource in the PDSCH.

In this embodiment, the row index in the preset time domain table indicates a plurality of different starting positions and corresponding symbol lengths, and the plurality of different starting positions correspond to a plurality of configurable symbol positions for the front loaded demodulation reference signal. For example, each row index in the preset time domain table may indicate a plurality of different starting positions and corresponding symbol lengths, or a certain row index or some row indexes in the preset time domain table may indicate a plurality of different starting positions and corresponding symbol lengths.

It should be noted that, the preset table may be configured in advance and stored in the base station and the user equipment. Alternatively, the base station and the user equipment appoint specific configurations of the preset table in advance, for instance, appointing the preset table by a communications protocol, and the base station and the user equipment can acquire the options in the preset table when needed.

For details, refer to Table 2. In the case where the mapping type is Type A, the front loaded DMRS is mapped based on a configured position of the physical broadcast channel (PBCH), such as symbol 2 and symbol 3. In the case where the mapping type is Type B, the front loaded DMRS is at the first symbol position of the time domain resource in the PDSCH.

Specifically, the parameter dmrs-TypeA-Position for the PBCH can configure that whether the front loaded DMRS is at symbol 2 or symbol 3.

In a specific implementation. PBCH may configure the front loaded DMRS at symbol 2 or symbol 3. In the preset table as shown in Table 2, the starting positions indicated by row indexes (such as X, X+1, X+2, X+3 . . . ) may be symbol 2 or symbol 3.

It is understandable that, under a conventional CP, a subframe includes 14 symbols that are Symbol 0, Symbol 1, Symbol 2 . . . and Symbol 13 in sequence, and under an extended CP, a subframe includes 12 symbols that are Symbol 0, Symbol 1, Symbol 2 . . . and Symbol 11 in sequence.

TABLE 2

| Index | Mapping Type | Slot Offset K0 | Starting position S | Symbol Length L |
|---|---|---|---|---|
| . . . | . . . | . . . | . . . | . . . |
| X | Type A | 0 | 2 | 12 |
|  |  |  | 3 | 11 |
| X + 1 | Type A | 0 | 2 | 10 |
|  |  |  |  | 9 |
| X + 2 | Type A | 0 | 2 | 9 |
|  |  |  | 3 | 8 |
| X + 3 | Type A | 0 | 2 | 8 |
|  |  |  | 3 | 7 |

It should be noted that, Table 2 only shows options for configurations of part of the time domain resources; other options may also be configured at the ellipsis places, e.g., some options for configurations in Table 1 may be chosen, and are not limited to the embodiments of the present disclosure.

In a specific implementation of step S102, a row index may be determined in a preset time domain table at least based on the starting symbol position.

For instance, if the starting symbol position is at symbol 2, the options with the starting position 2 for the indexes X, X+1, X+2, and X+3 can be determined, excluding the options with the starting position 3; if the starting symbol position is at symbol 3, the options with the starting position 3 for the indexes X, X+1, X+2, and X+3 can be determined, excluding the options with the starting position 2.

Furthermore, the base station may further determine the row index in conjunction with a symbol length required by the time domain resource. Thereafter, the row index is carried in the downlink control information and transmitted to the user equipment in the step S103.

It should be noted that the base station may further determine the row index in conjunction with the slot offset of the time domain resources.

In the embodiment of the present disclosure, the row index in the preset time domain table indicates a plurality of different starting positions, and the plurality of different starting positions correspond to a plurality of configurable symbol positions for the front loaded demodulation reference signal, thereby fewer row indexes can indicate more starting symbol positions, furthermore, in the case that the total amount of row indexes in the preset table is limited, the row indexes can be saved for configurations of other more mapping types, achieving the flexibility in PDSCH schedule.

Furthermore, the symbol position for the front loaded demodulation reference signal is mapped based on physical broadcast channel configurations.

Further referring to Table 2, a plurality of different starting positions correspond to a plurality of configurable symbol positions for the front loaded DMRS. The plurality of configurable symbol positions for the front loaded DMRS are mapped based on the configurations of the PBCH. For example, a plurality of configurable symbol positions where the PBCH can configure the front loaded DMRS include symbol 2 and symbol 3.

It is understandable to one of skill in the art that the symbols used in the embodiments of the present disclosure all refer to symbols in a single subframe, starting with the Symbol 0 and ending with the Symbol 13 or the Symbol 11.

In a specific embodiment of the present disclosure, the step S103 shown in FIG. 1 may include: carrying the row index in the downlink control information in the Format 1_0, and transmitting the downlink control information to a user equipment.

Specifically, the DCI format may include 1_0 and 1_1. The table used by DCI in the Format 1_1 can be configured by high layer signaling. Therefore, the row index determined in the preset table by the method shown in FIG. 1 can be transmitted to the UE through the DCI in the Format 1_0.

In an application scenario of the present disclosure, the user equipment may detect the downlink control information outside a set of control resources of physical broadcast channel configurations.

Specifically, the set of control resources CORESET0 is configured by the PBCH when the UE initially accesses the cell, and the UE can monitor the PDCCH within the set of control resources CORESET0. The detection of DCI 1_0 within the set of control resources CORESET0 is limited by the time-frequency domain relationship between the SSB and the PDSCH and PDCCH, and has to meet the preset time-frequency domain conditions but cannot be configured randomly. The detection of DCI 1_0 in other sets of control resources than the set of control resources CORESET0 may not be limited by the time-frequency domain relationship between the SSB and the PDSCH and PDCCH, thus can be configured in a wider range. Embodiments of the present disclosure may be applied in such a scenario.

To be specific, DCI 1_0 can include, but not limited to, the following:
Identifier for DCI formats;
Frequency domain resource assignment;
Time domain resource assignment;
virtual resource block (VRB) to physical resource block (PRB) mapping (VRB-to-PRB mapping);
Modulation and coding scheme;
New data indicator;
Redundancy version;
HARQ process number;
Downlink assignment index;
TPC command for scheduled PUCCH;
PUCCH resource indicator;
PDSCH-to-HARQ feedback timing indicator.

In another application scenario of the present disclosure, the user equipment detects the downlink control information within the set of control resources, and the set of control resources are time-division multiplexed with the transmission resources for the physical downlink shared channel.

As described above, the detection of DCI 1_0 within the set of control resources CORESET0 is limited by the time-frequency domain relationship between the SSB and the PDSCH and PDCCH, and meets the preset time-frequency domain conditions. In this scenario, the time-frequency domain relationship between the SSB and the PDSCH and PDCCH is time-division multiplexing.

In a possible embodiment, the starting symbol position indicated by the row index is 8, and the symbol length occupied by the time domain resource is 4.

For example, when the symbol position for the front loaded demodulation reference signal is at the first symbol position of the time domain resource, and the frequency at which the set of control resources is located is greater than the preset frequency, the starting symbol position indicated by the row index can be 8, and the symbol length occupied by the time domain resource can be 4. In a scenario where DCI 1_0 is detected within the set of control resources CORESET0 and the time-frequency domain relationship between the SSB and the PDSCH and PDCCH is time-division multiplexing, the frequency at which the set of control resources CORESET0 is located is greater than the preset frequency, e.g., 6 GHz, that is, the set of control resources CORESET0 is at a high frequency, and the UE demands for DCI receiving and PDSCH scheduling in the same slot. Thus, row indexes can be added to the preset table, i.e., an option indicating the starting symbol position being 8 and the symbol length occupied by the time domain resource being 4.

TABLE 3

| Index | Mapping Type | Slot Offset K0 | Starting symbol position S | Symbol Length L |
|---|---|---|---|---|
| ... | ... | ... | ... | ... |
| Y | Type B | 0 | 8 | 4 |

As listed in Table 3, the row index Y indicates that the starting symbol position of the time domain resource is 8 and the symbol length occupied by the time domain resource is 4. Accordingly, when the symbol position of the set of control resources CORESET0 is 7 and the symbol length is 1, the PDSCH can be scheduled in the current slot (namely, the slot where the Symbols 7, 8, 9, 10, 11 are located).

It should be noted that Table 3 only shows options for the configurations of part of time domain resources; other options may also be configured at the ellipsis places, e.g., some options for configurations in Tables 1 and 2 may be chosen, and are not limited to the embodiments of the present disclosure.

In another embodiment of the present disclosure, the starting symbol position indicated by the row index is 8, 9, or 10, and the symbol length occupied by the time domain resource is 4; or the starting symbol position indicated by the row index is 7, and the symbol length occupied by the time domain resource is 7.

For instance, when the user equipment detects the downlink control information outside the set of control resources of the physical broadcast channel configurations and the symbol position for the front loaded demodulation reference signal is at the first symbol position of the time domain resource, the starting symbol position indicated by the row index is 8, 9, or 10, and the symbol length occupied by the time domain resource is 4; or the starting symbol position indicated by the row index is 7, and the symbol length occupied by the time domain resource is 7. As mentioned above, the detection of DCI 1_0 in other set of control resources than the set of control resources CORESET0 may not be limited by the time-frequency domain relationship between the SSB and the PDSCH and PDCCH, thus can be configured in a wider range. The mapping type of the PDSCH is Type B. That is, there are more configurations for the time domain resources available for the PDSCH when the symbol position of the front loaded DMRS is not limited to the PBCH configuration. Thus, the embodiment of the present disclosure supports, in the preset table, the configurations where the starting symbol position is 8, 9, or 10, and the symbol length occupied by the time domain resource is 4; and where the starting symbol position is 7, the symbol length occupied by the time domain resource is 7.

For details, refer to Table 4. The options in the preset table support the following configurations.

TABLE 4

| Index | Mapping Type | Slot Offset K0 | Starting position S | Symbol Length L |
|---|---|---|---|---|
| ... | ... | ... | ... | ... |
| Y | Type B | 0 | 8 | 4 |
| Z | Type B | 0 | 9 | 4 |

TABLE 4-continued

| Index | Mapping Type | Slot Offset K0 | Starting position S | Symbol Length L |
|---|---|---|---|---|
| Z + 1 | Type B | 0 | 10 | 4 |
| Z + 2 | Type B | 0 | 7 | 7 |

The embodiments of the present disclosure realize more configurations or scheduling PDSCH resources under the mapping Type B, and further improve the flexibility in PDSCH schedule.

It should be noted that, Table 4 only shows options for the configurations of part of the time domain resources; other options may also be configured at the ellipsis places, e.g., some options for configurations in Tables 1 and 2 may be chosen, and are not limited to the embodiments of the present disclosure.

Figure 2:
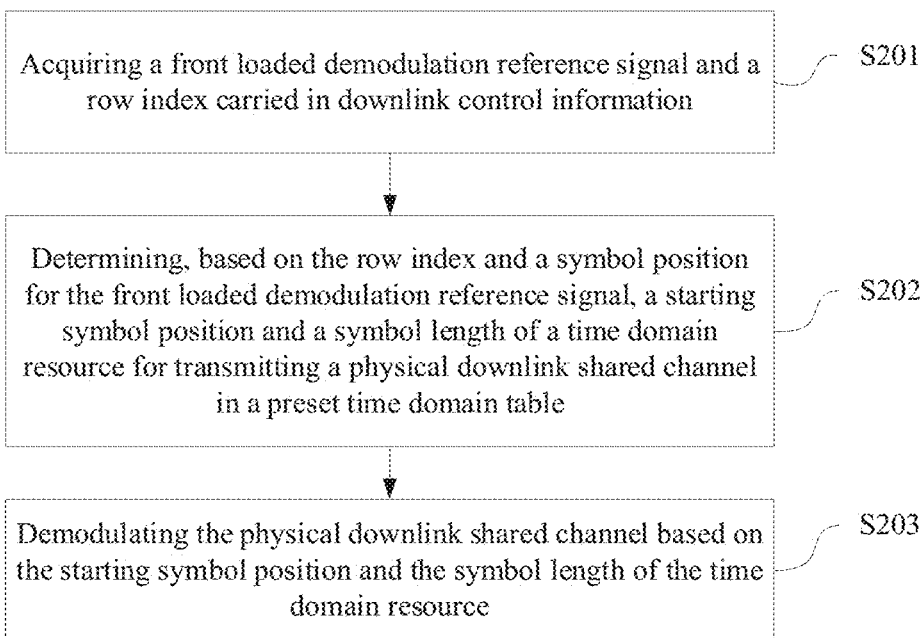
FIG. 2 is a flow chart of a method for physical downlink shared channel receiving according to an embodiment of the present disclosure.

As shown in FIG. 2, the method for physical downlink shared channel receiving may comprise:

step S201: acquiring a front loaded demodulation reference signal and a row index carried in downlink control information;

step S202: determining, based on the row index and a symbol position for the front loaded demodulation reference signal, a starting symbol position and a symbol length of a time domain resource for transmitting a physical downlink shared channel in a preset time domain table; and step S203: demodulating the physical downlink shared channel based on the starting symbol position and the symbol length of the time domain resource.

The method for physical downlink shared channel receiving as shown in FIG. 2 is applicable on the user equipment side.

In specific implements of step S201, the UE can receive the front loaded DMRS and the DCI transmitted by the base station. The DCI carries row indexes. In a preset table, the row index may indicate a starting symbol position and a symbol length of a time domain resource for the PDSCH. One of skill in the art can understand that the row index can also indicate a slot offset, a mapping type, and the likes of the time domain resource for the PDSCH.

In specific implements of step S202, based on the row indexes, a plurality of different starting positions indicated by the row indexes may be determined in the preset time domain table. The starting symbol position of the time domain resource can be determined based on the symbol position for the front loaded DMRS. So far, the UE can determine the starting symbol position and the symbol length of the time domain resource for the PDSCH.

For example, further referring to Table 2, the symbol position for the DMRS received by the UE is 2, and the row index is X. It is possible to determine the following two options based on index X: the starting position S is 2, and the symbol length L is 12; and the starting position S is 3, and the symbol length L is 11. Since the symbol position for the front loaded DMRS is 2, the UE can determine that the starting symbol position of the time domain resource for the PDSCH is 2 and the symbol length is 12.

Thereafter, in step S203, the PDSCH can be demodulated within the time domain resource defined by the starting symbol position and the symbol length. Specifically, the UE can demodulate the PDSCH by utilizing the front loaded DMRS.

In this embodiment, a row index in the preset time domain table indicates a plurality of different starting positions, and the plurality of different starting positions correspond to a plurality of configurable symbol positions for the front loaded demodulation reference signal, thereby fewer row indexes can be used to indicate more starting symbol positions; furthermore, in the case that the total amount of row indexes in the preset table is limited, the row indexes can be saved for configurations of other more mapping types, achieving the flexibility in PDSCH schedule.

In a specific embodiment of the present disclosure, the step S201 as shown in FIG. 2 may comprise: receiving the row index carried in the downlink control information in the Format 1_0.

In a specific application of the present disclosure, the step S201 as shown in FIG. 2 may further comprise: detecting and receiving the downlink control information outside the set of control resources of the physical broadcast channel configurations.

In another specific application of the present disclosure, the step S201 as shown in FIG. 2 may further comprise: detecting the downlink control information within a set of control resources, where the set of control resources and the transmission resource of the physical downlink shared channel are time-division multiplexed.

Furthermore, when the symbol position for the front loaded demodulation reference signal is at the first symbol position of the time domain resource and the frequency at which the set of control resources is located is greater than the preset frequency, the starting symbol position indicated by the row index is 8, and the symbol length occupied by the time domain resource is 4.

In another specific embodiment of the present disclosure, the symbol position for the front loaded DMRS is mapped based on the configuration of the physical broadcast channel.

In yet another specific embodiment of the present disclosure, the step S201 as shown in FIG. 2 may further comprise: the starting symbol position indicated by the row index is 8, 9, or 10, and the symbol length occupied by the time domain resource is 4; or the starting symbol position indicated by the row index is 7, and the symbol length occupied by the time domain resource is 7. For example, in the cases where the downlink control information is detected outside the set of control resources of the physical broadcast channel configurations and the symbol position for the front loaded DMRS is at the first position of the time domain resource, the starting symbol position indicated by the row index is 8, 9, or 10, and the symbol length occupied by the time domain resource is 4; or the starting symbol position indicated by the row index is 7, the symbol length occupied by the time domain resource is 7.

Figure 3:
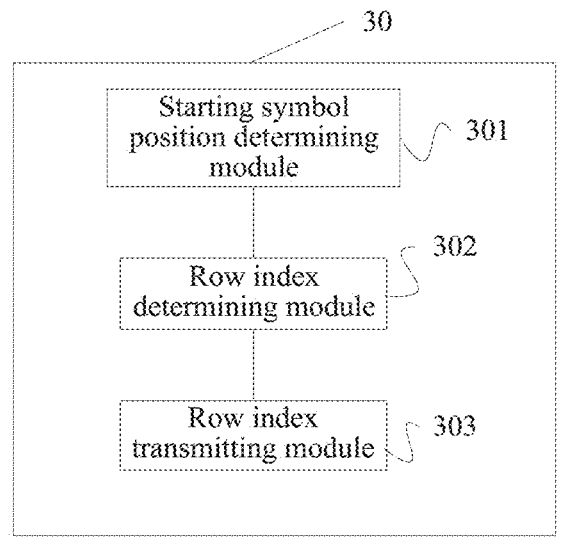
FIG. 3 is a structural schematic view of a device for indicating a time domain resource for a physical downlink shared channel according to an embodiment of the present disclosure.

Referring to FIG. 3, a device 30 for indicating the time domain resource for the physical downlink shared channel is applicable on the base station side. The device 30 for indicating the time domain resource for the physical downlink shared channel may include starting symbol position determining module 301, a row index determining module 302, and a row index transmitting module 303.

Wherein, the starting symbol position determining module 301 is adapted to determine a starting symbol position of the time domain resource for transmitting the physical downlink shared channel based on a symbol position for a front loaded demodulation reference signal;

the row index determining module 302 is adapted to determine a row index in a preset time domain table at least based on the starting symbol position; and the row index transmitting module 303 is adapted to carry the row index in downlink control information and transmit the downlink control information to a user equipment.

The row index in the preset time domain table indicates a plurality of different starting positions and corresponding symbol lengths, wherein the plurality of different starting positions correspond to a plurality of configurable symbol positions for the front loaded demodulation reference signal.

The time domain resource indicating device 30 of the physical downlink shared channel can be integrated into the base station internally or coupled to the base station externally.

The base station can determine the starting symbol position of the time domain resource for PDSCH based on the symbol position for the front loaded DMRS. In other words, the symbol position for the front loaded DMRS is the starting symbol position of the time domain resource for the PDSCH.

It should be noted that, the preset table may be configured in advance and stored in the base station and the user equipment. Alternatively, the base station and the user equipment appoint specific configurations of the preset table in advance, for instance, appointing the preset table by a communications protocol, and the base station and the user equipment can acquire the options in the preset table when needed.

In embodiments of the present disclosure, the row index in the preset time domain table indicates a plurality of different starting positions, and the plurality of different starting positions correspond to a plurality of configurable symbol positions for the front loaded demodulation reference signal, thereby fewer row indexes can be used to indicate more starting symbol positions; furthermore, in the case that the total amount of row indexes in the preset table is limited, the row indexes can be saved for configurations of other more mapping types, achieving the flexibility in PDSCH schedule.

In a specific embodiment of the present disclosure, the row index transmitting module 303 may carry the row index in the downlink control information in the format 1_0 and transmit the downlink control information to the user equipment.

Specifically, the format of the DCI may include 1_0 and 1_1. The table used by the DCI in the Format 1_1 can be configured by high layer signaling. Therefore, the row index determined in the preset table can be transmitted to the UE via the DCI in the format 1_0.

In an application of the present disclosure, the user equipment detects the downlink control information outside a set of control resources of the physical broadcast channel configurations.

In another application of the present disclosure, the user equipment detects the downlink control information within the set of control resources, and the set of control resources are time-division multiplexed with transmission resources for the physical downlink shared channel.

Specifically, the set of control resources CORESET0 is configured by the PBCH when the UE initially accesses the cell, and the UE can monitor the PDCCH within the set of control resources CORESET0. The detection of DCI 1_0 within the set of control resources CORESET0 is limited by the time-frequency domain relationship between the SSB and the PDSCH and PDCCH, and has to meet the preset time-frequency domain conditions but cannot be configured randomly. The detection of DCI 1_0 in other sets of control resources than the set of control resources CORESET0 may not be limited by the time-frequency domain relationship between the SSB and the PDSCH and PDCCH, thus can be configured in a wider range. Embodiments of the present disclosure may be applied in such a scenario.

As described above, the detection of DCI 1_0 within the set of control resources CORESET0 is limited by the time-frequency domain relationship between the SSB and the PDSCH and PDCCH, and meets the preset time-frequency domain conditions. In this scenario, the time-frequency domain relationship between the SSB and the PDSCH and PDCCH is time-division multiplexing.

Furthermore, the starting symbol position indicated by the row index is 8, and the symbol length occupied by the time domain resource is 4.

For example, when the symbol position for the front loaded demodulation reference signal is at the first symbol position of the time domain resource, and the frequency at which the set of control resources is located is greater than the preset frequency, the starting symbol position indicated by the row index can be 8, and the symbol length occupied by the time domain resource can be 4. In a scenario where DCI 1_0 is detected within the set of control resources CORESET0 and the time-frequency domain relationship between the SSB and the PDSCH and PDCCH is time-division multiplexing, the frequency at which the set of control resources CORESET0 is located is greater than the preset frequency, e.g., 6 GHz, that is, the set of control resources CORESET0 is at a high frequency, and the UE demands for DCI receiving and PDSCH scheduling in the same slot. Thus, row indexes can be added to the preset table, i.e., an option indicating the starting symbol position being 8 and the symbol length occupied by the time domain resource being 4.

To be specific, the starting symbol position indicated by the row index is 8, 9, or 10, and the symbol length occupied by the time domain resource is 4; or the starting symbol position indicated by the row index is 7, and the symbol length occupied by the time domain resource is 7. For example, when the user equipment detects the downlink control information outside the set of control resources of the physical broadcast channel configurations and the symbol position for the front loaded demodulation reference signal is at the first symbol position of the time domain resource, the starting symbol position indicated by the row index can be 8, 9, or 10, and the symbol length occupied by the time domain resource can be 4; or the starting symbol position indicated by the row index can be 7, and the symbol length occupied by the time domain resource can be 7.

As noted previously, the detection of DCI 1_0 in other set of control resources than the set of control resources CORESET0 may not be limited to the time-frequency domain relationship between the SSB and the PDSCH and PDCCH, thus can be configured in a wider range. There are more configurations for the time domain resources available for the PDSCH when the mapping type of the PDSCH is Type B, that is, the symbol position of the front loaded DMRS is not limited by the PBCH configuration. Thus, the embodiment of the present disclosure supports, in the preset table, the configurations where the starting symbol position is 8, 9, or 10, and the symbol length occupied by the time domain resource is 4; and where the starting symbol position is 7, the symbol length occupied by the time domain resource is 7. Please refer to the descriptions in conjunction with FIGS. 1 and 2 for more details of the working principles and working modes of the time domain resource indicating device 30 of the physical downlink shared channel, which is not repeated here.

Figure 4:
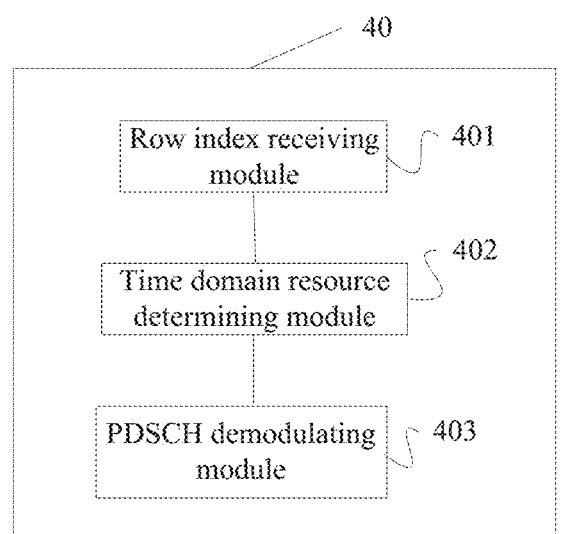
FIG. 4 is a structural schematic view of a device for physical downlink shared channel receiving according to an embodiment of the present disclosure.

With reference to FIG. 4, the device for physical downlink shared channel receiving 40 is applicable on the UE side. The device for physical downlink shared channel receiving 40 may comprise: a row index receiving module 401, a time domain resource determining module 402, and a physical downlink shared channel (PDSCH) demodulating module 403.

The row index receiving module 401 is adapted to acquire a front loaded demodulation reference signal and a row index carried in downlink control information; the time domain resource determining module 402 is adapted to determine, based on the row index and a symbol position for the front loaded demodulation reference signal, a starting symbol position and a symbol length for a time domain resource for transmitting a physical downlink shared channel in a preset time domain table; and the physical downlink shared channel demodulating module 403 is adapted to demodulate the physical downlink shared channel based on the starting symbol position and the symbol length for the time domain resource.

The row index in the preset time domain table indicates a plurality of different starting positions and corresponding symbol lengths, and the plurality of different starting positions correspond to a plurality of configurable symbol positions for the front loaded demodulation reference signal.

In embodiments of the present disclosure, the row index in the preset time domain table indicates a plurality of different starting positions, and the plurality of different starting positions correspond to a plurality of configurable symbol positions for the front loaded demodulation reference signal, thereby fewer row indexes can be used to indicate more starting symbol positions; furthermore, in the case that the total amount of row indexes in the preset table is limited, the row indexes can be saved for configurations of other more mapping types, achieving the flexibility in PDSCH schedule.

In a specific embodiment of the present disclosure, the row index receiving module 401 can receive the row index carried in the downlink control information in the Format 1_0.

In a specific application of the present disclosure, the row index receiving module 401 detects and receives the downlink control information outside a set of control resources of physical broadcast channel configurations.

In another specific application of the present disclosure, the row index receiving module 401 detects the downlink control information within a set of control resources, and the set of control resources are time-division multiplexed with transmission resources for the physical downlink shared channel.

Furthermore, the starting symbol position indicated by the row index is 8, and the symbol length occupied by the time domain resources is 4. For example, when the symbol position for the front loaded demodulation reference signal is at the first symbol position of the time domain resource and the frequency at which the set of control resources is located is greater than the preset frequency, the starting symbol position indicated by the row index is 8, and the symbol length occupied by the time domain resource is 4.

In embodiments of the present disclosure, the mapping type of PDSCH is Type B, i.e., the symbol position for the front loaded demodulation reference signal is at the first symbol position of the time domain resource. When the time-domain relationship between the set of control resources and the PDSCH is time-division multiplexing and the frequency at which the set of control resources is located is at a high frequency, it is possible to support a configuration that the starting symbol position of the time domain resource is 8 and the occupied symbol length is 4, so as to finish the resource schedule for the PDSCH within the same slot when the starting position for the set of control resources is 7 and the length thereof is 1, meeting the user's demands.

In another specific embodiment of the present disclosure, the starting symbol position indicated by the row index is 8, 9, or 10, and the symbol length occupied by the time domain resource is 4; or the starting symbol position indicated by the row index is 7, and the symbol length occupied by the time domain resource is 7. For example, when the row index receiving module 401 detects the downlink control information outside the set of control resources of the physical broadcast channel configurations and the symbol position for the front loaded DMRS is at the first position of the time domain resource, the starting symbol position indicated by the row index can be 8, 9, or 10, and the symbol length occupied by the time domain resource can be 4; or the starting symbol position indicated by the row index is 7, the symbol length occupied by the time domain resource is 7.

In embodiments of the present disclosure, when the mapping type of PDSCH is Type B, and the user equipment detects the downlink control information outside a set of control resources of physical broadcast channel configurations, it is possible to support a configuration that the starting symbol position of the time domain resource is 8, 9, or 10, and the occupied symbol length is 4, and that the starting symbol position of the time domain resource is 7, the occupied symbol length is 7, so as to realize more configurations of the resource schedule for PDSCH under the mapping Type B, and further improve the flexibility in PDSCH schedule.

Please refer to the descriptions in conjunction with FIGS. 1 and 2 for more details of the working principles and working modes of the device for physical downlink shared channel receiving 40, which is not repeated here.

An embodiment of the present disclosure also provides a storage medium having computer instructions stored thereon, wherein when operated by a machine the computer instructions can cause the machine to execute the steps of the method for indicating a time domain resource for a physical downlink shared channel as shown in FIG. 1, or the steps of the method for physical downlink shared channel receiving as shown in FIG. 2. The storage medium may include ROM, RAM, magnetic discs, optical disks, etc. The storage medium may further include a non-volatile memory or a non-transitory memory, or the likes.

An embodiment of the present disclosure also provides a base station, comprising: a memory storing computer instructions executable on a processor, and the processor, wherein when operated by the processor the computer instructions can cause the processor to execute the steps of the method for indicating a time domain resource for a physical downlink shared channel as shown in FIG. 1.

An embodiment of the present disclosure also provides a terminal, comprising a memory storing computer instructions executable on a processor, and the processor, wherein when operated by the processor the computer instructions can cause the processor to execute the steps of the method for physical downlink shared channel receiving as shown in FIG. 2. The terminal includes, but not limited to, terminal devices such as mobile phones, computers, and tablet PC.

Although the present disclosure is described in the foregoing, it is not limited thereto. Without departing the spirits and the scope of the present disclosure, a number of variations and modifications may occur to one skilled in the art. Therefore, the protection scope of the present disclosure should be defined by the claims.

What is claimed is:

1. A method for wireless communications by a user equipment for receiving physical downlink shared channel, the method comprising:
   acquiring a symbol position of a front loaded demodulation reference signal and a row index carried in downlink control information;
   determining, based on the row index and the symbol position of the front loaded demodulation reference signal, a starting symbol position and a symbol length of a time domain resource for transmitting the physical downlink shared channel in a preset time domain table, wherein each row index in the preset time domain table indicates a plurality of different starting positions and corresponding symbol lengths, the plurality of different starting positions corresponding to a plurality of configurable symbol positions of the front loaded demodulation reference signal; and
   demodulating the physical downlink shared channel based on the starting symbol position and the symbol length of the time domain resource.

2. The method according to claim 1, wherein acquiring the row index carried in the downlink control information comprises:
   detecting second downlink control information within a set of control resources, wherein the set of control resources are configured to be time-division multiplexed with transmission resources for the physical downlink shared channel.

3. The method according to claim 2, wherein the starting symbol position indicated by the row index is 8, and the symbol length occupied by the time domain resource is 4.

4. The method according to claim 1, wherein the symbol position of the front loaded demodulation reference signal is configured to be mapped based on physical broadcast channel configurations.

5. The method according to claim 1, wherein acquiring the row index carried in the downlink control information comprises:
   the starting symbol position indicated by the row index is 8, 9, or 10, and the corresponding respective symbol length occupied by the time domain resource is 4; or the starting symbol position indicated by the row index is 7, and the symbol length occupied by the time domain resource is 7.

6. The method of claim 1, wherein the plurality of different starting positions comprises a symbol position in a second half of a slot.

7. A terminal comprising:
   a memory storing computer instructions executable on a processor, and
   the processor,
   wherein the computer instructions cause the processor to:
   acquire a symbol position of a front loaded demodulation reference signal and a row index carried in downlink control information;
   detect and receive the downlink control information outside a set of control resources of physical broadcast channel configurations;
   determine, based on the row index and the symbol position of the front loaded demodulation reference signal, a starting symbol position and a symbol length of a time domain resource for transmitting a physical downlink shared channel in a preset time domain table, wherein each row index in the preset time domain table indicates a plurality of different starting positions and corresponding symbol lengths, the plurality of different starting positions corresponding to a plurality of configurable symbol positions of the front loaded demodulation reference signal; and
   demodulate the physical downlink shared channel based on the starting symbol position and the symbol length of the time domain resource.

8. The terminal according to claim 7, wherein the computer instructions further cause the processor to detect second downlink control information within the set of control resources, and the set of control resources are configured to be time-division multiplexed with transmission resources for the physical downlink shared channel.

9. The terminal according to claim 8, wherein the starting symbol position indicated by the row index is 8, and the symbol length occupied by the time domain resource is 4.

10. The terminal according to claim 7, wherein the symbol position of the front loaded demodulation reference signal is configured to be mapped based on physical broadcast channel configurations.

11. The terminal according to claim 7, wherein the starting symbol position indicated by the row index is 8, 9, or 10, and the symbol length occupied by the time domain resource is 4; or, the starting symbol position indicated by the row index is 7, and the symbol length occupied by the time domain resource is 7.

12. A non-transitory computer-readable storage medium having computer instructions stored thereon, wherein the computer instructions cause a machine to:
   acquire a symbol position of a front loaded demodulation reference signal and a row index carried in downlink control information;
   determine, based on the row index and the symbol position of the front loaded demodulation reference signal, a starting symbol position and a symbol length of a time domain resource for transmitting a physical downlink shared channel in a preset time domain table, wherein each row index in the preset time domain table indicates a plurality of different starting positions and corresponding symbol lengths, the plurality of different starting positions corresponding to a plurality of configurable symbol positions of the front loaded demodulation reference signal; and
   demodulate the physical downlink shared channel based on the starting symbol position and the symbol length of the time domain resource.

* * * * *